United States Patent

Dlouhy et al.

[11] 4,067,644
[45] Jan. 10, 1978

[54] ELECTROCHROMIC DISPLAY DEVICE WITH A CONTRAST-ENHANCING ADJUVANT AND METHOD OF PRODUCING THE SAME

[75] Inventors: Jiri Dlouhy, Magenwil; Hans-Rudolf Zeller, Birr, both of Switzerland

[73] Assignee: BBC Brown Boveri & Company Limited, Baden, Switzerland

[21] Appl. No.: 673,159

[22] Filed: Apr. 2, 1976

[30] Foreign Application Priority Data

May 7, 1975 Switzerland .................. 5867/75

[51] Int. Cl.² .............................................. G02F 1/36
[52] U.S. Cl. ............................................. 350/160 R
[58] Field of Search ................................. 350/160 R

[56] References Cited

U.S. PATENT DOCUMENTS

| 3,453,038 | 7/1969 | Kissa et al. ........... 350/160 R |
| 3,944,333 | 3/1976 | Leibowitz ............. 350/160 R |

*Primary Examiner*—William L. Sikes
*Attorney, Agent, or Firm*—Oblon, Fisher, Spivak, McClelland & Maier

[57] ABSTRACT

An improved electrochromic display device and a method of manufacturing it are disclosed. The improved device includes at least one layer of light absorbing and/or light reflecting fabric as a contrast enhancing adjuvant in the electrolyte of the device. According to the method of the invention a transparent support, at least one layer of fabric and a counter-electrode are assembled in laminated form and sealed together by an adhesive applied at the edges of the assembled structure.

3 Claims, 1 Drawing Figure

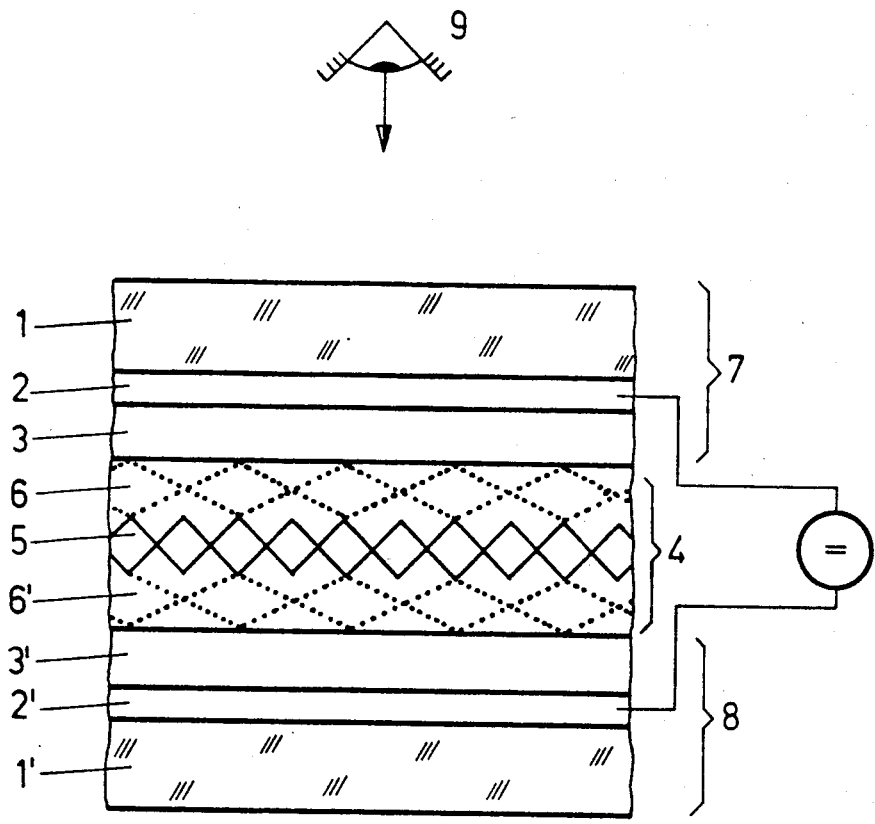

ELECTROCHROMIC DISPLAY DEVICE WITH A CONTRAST-ENHANCING ADJUVANT AND METHOD OF PRODUCING THE SAME

BACKGROUND OF THE INVENTION

1. Field of the Invention

The present invention relates to an electrochromic display device of laminated construction and more particularly to such a device with an electrolyte which contains a contrast-enhancing adjuvant in order to intensify the contrast between the colourless and the coloured states of an electrochromic layer, and to a method of producing such a display device.

2. Description of the Prior Art

A display device of the above-mentioned type is already known from DT-OS 2,201,104. The display device described in this published specification contains a laminar electrolyte in contact with an electrochromic layer, preferably exhibiting a high protonic conductivity, to which a pigment, such as white titanium dioxide or a yellow titanate, is added in order to enhance the contrast between the coloured and colourless states of the electrochromic layer. However such pigments exhibit large specific surfaces so that the addition of the pigment to the electrolyte causes chemical impurities, more particularly water, to be introduced into the indicating device. Owing to these impurities a device of the above-mentioned type can only be operated with a low service voltage, so that the switching-over from the colourless to the coloured state, and vice versa, takes a very long time. To increase the service voltage, on the other hand, would reduce the useful life of the device very considerably.

SUMMARY OF THE INVENTION

It is therefore one object of the present invention to produce an improved display device which exhibits a particularly strong contrast between the coloured and colourless states.

A further object of the present invention is the provision of an improved electrochromic display device having a short switching time and a long useful life.

Yet another object of the present invention is the provision of an improved electrochromic display device which can be manufactured simply and economically.

A still further object of the present invention is the provision of a novel method of manufacturing electrochromic display devices.

Briefly, these and other objects of the invention are achieved by providing at least one layer of a light absorbing and/or light reflecting fabric as a contrast enhancing adjuvant in the electrolyte of an electrochromic display device. According to the method of the present invention, a transparent support, at least one layer of fabric and a counter-electrode are placed on one another in laminated form. These are fixed by adhesive at the edges and are sealed except for a gap left for adding the electrolyte.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The FIGURE is a sectional view taken through a symmetrically constructed electrochromic display device.

DESCRIPTION OF THE PREFERRED EMBODIMENT

The invention is based upon the discovery by the applicant that the proton content and the water content of the electrolyte may be kept as low as possible by preventing the ultra-pure electrolyte from being contaminated by water and other substances adsorbed in the added pigment, by the sole addition of a fabric. Experiments by the applicant have in fact shown that in agueous electrolytes the service voltage is restricted to values up to 1.6 volt, because otherwise electrolytic side reactions occur which drastically reduce the useful life of the display device. In anhydrous and proton-free electrolytes the service voltage can be increased to values over 5V without detrimental effect upon the useful life. Now this increase produces a very much quicker response of the display device, because the speed of indication is a function of the service voltage.

Display devices with a light-absorbing and/or light-reflecting fabric as a contrast-enhancing adjuvant in the electrolyte not only appeal to the observer by a particular brilliance and uniformity of the indicating surface reproducing the information, but also still exhibit a long useful life at high service voltages, i.e. with short switching times, which is expressed in the fact that even after $10^6$ switching cycles at voltages of up to 10V no gas bubbles are formed and no electrodes are corroded in the electrochromic cell. The explanation of this surprisingly long useful life is presumably to be found in the high degree of purity of the electrolyte, which is preserved by the incorporation of a fabric which exhibits only a small specific surface and therefore few impurities.

Further particulars of the invention will appear from the exemplary embodiment described hereinbelow and illustrated in the accompanying drawing.

Referring now to the FIGURE, layers 2,2' of tin dioxide ($SnO_2$) and 3,3' of tungsten trioxide ($WO_3$) are applied on two support plates 1,1' (e.g. by vacuum vaporization) and are mutually separated by an electrolyte layer 4 and several layers of fabric 5,6,6'. The fabric 5 exhibits a light-absorbing and/or light-reflecting surface, whereas the fabrics 6,6' are transparent. The support plate 1 facing the observer 9 is transparent and jointly with the tin dioxide layer 2 acting as electrode and with the electrochromic $WO_3$ layer 3 is designated as the support 7, whereas the second support plate 1', which is remote from the observer, together with the tin dioxide layer 2' and the $WO_3$ layer 3' only have to perform the function of an electrode and are therefore designated as counter-electrode 8.

Glass was used for the support plates 1,1', but any other transparent material, e.g. transparent plastics, are also suitable for the support plate 1, whereas for the support plate 1', the only desiderata is mechanical stability, and transparency is not necessary. The $SnO_2$ layers 2,2' applied on the glass support plates 1,1' are a few $\mu$ thick, transparent and are connected to a direct voltage source of approximately 10V. The tungsten trioxide layers 3,3' subsequently applied on the tin dioxide exhibit a thickness of a few tenths $\mu$ and are colourless before a direct voltage is applied to the electrode layers 2,2'.

The electrolyte 4 consists of an approximately 1-molar lithium perchlorate solution is propylene carbonate. Obviously other electrolytes are also conceivable and could be used, but the condition of prime importance is that they supply cations which, like H+ or Li+, cause a colouration of the electrochromic layer 3. The fabric 5,6,6' consisting of polytetrafluoro ethylene exhibits a mesh aperture of approximately 100 μ. Such fabrics can be obtained commercially, e.g. from Seidengazefabrik AG Thal/St. Gallen. In addition, fabrics of organic fibres such as polytetrafluoro ethylene or polyamides (nylon), fabrics of inorganic fibres such as silicon dioxide or carbon may also be used, the prime condition being that the fabrics are compatible with the electrolyte.

A colouration of the fabric can be caused by the incorporation of suitable dyes, but on the other hand it is also possible to make the fabric reflecting by vaporization with a metal. The fabric 5 of the exemplary embodiment includes a layer of gold approximately 1000 A thick. Two further but unvaporized and transparent fabrics 6,6', between which the gold vaporized fabric 5 is placed, insulate the latter from the electrochromic layer 3 and from the counter-electrode 8. The gold vaporized fabric 5 achieves a particularly good effect upon the observer 9 if it is not covered with the transparent fabric 6, but is provided with a layer of aluminium oxide ($Al_2O_3$), silicon oxide (SiO) or another electrolyte-resistant transparent insulating material, which is applied in a vaporizing process.

When manufacturing a display device according to the invention it is convenient, firstly, to assemble the transparent support 7, at least one layer of fabric 5,6,6' and a counter-electrode 8 on one another in laminated form, then to fix them at their edges by an adhesive (e.g. with a two-component epoxy adhesive) and then to seal them except for a filling gap for the electrolyte 4. The electrolyte is then placed with a hypodermic syringe into the fabric-packed interior of the display device and the filling gap is closed with the adhesive material. It is also to be recommended to space the support 7 and counter-electrode 8 by means of interposed foils.

The display device according to the invention surprises the observer, when suitable raw materials are used, by a noticeably richly contrasted reproduction of the information to be indicated. More particularly, if an electrochromic layer 3 of tungsten trioxide is used, which colours blue when direct voltage is applied to the electrode layers 2,2' by the formation of a tungsten bronze $Li_xWO_3$, $x<0.3$, the gold-yellow background of the gold-coated fabric 5 produces a particularly advantageous effect.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In an electrochromic display device of laminated construction including a liquid electrolyte, a solid electrochromic layer and means acting as a contrast enhancing adjuvant, the improvement comprising:
   a. fabric means in the electrolyte for acting as a contrast enhancing adjuvant,
   b. the fabric means comprising layers of a fabric with a mesh aperture of approx. 100 μ,
   c. the layers comprising at least one layer incorporating a dye or being provided with a layer of electrolyte-resistant metal,
   d. the layer incorporating a dye being of an electrically insulating material or being positioned on one side of a layer of a transparent and electrically insulating fabric and
   e. the layer being provided with a layer of electrolyte-resistant metal comprising an electrically insulating layer disposed on the surface of the metal or being positioned on one side of a layer of a transparent and electrically insulating fabric and
   f. the electrolyte being free of pigments.

2. A display device as in claim 1 wherein the layer of electrolyte-resistant metal consists of gold and the electrically insulating layer disposed on the gold consists of silicon or aluminum oxide.

3. A display device as in claim 1 wherein the layer of fabric incorporating a dye or being provided with a layer of electrolyte-resistant metal consists of nylon, polytetrafluoro ethylene, glass-fibre or carbon-fibre.

* * * * *